United States Patent

Lin

(10) Patent No.: US 9,465,628 B2
(45) Date of Patent: Oct. 11, 2016

(54) ELECTRONIC DEVICE

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 138 days.

(21) Appl. No.: 14/456,111

(22) Filed: Aug. 11, 2014

(65) Prior Publication Data

US 2015/0046693 A1 Feb. 12, 2015

(30) Foreign Application Priority Data

Aug. 12, 2013 (CN) .................. 2013 1 03478345

(51) Int. Cl.
| | | |
|---|---|---|
| G06F 13/10 | (2006.01) | |
| G06F 9/445 | (2006.01) | |
| H04B 1/20 | (2006.01) | |
| G08C 19/28 | (2006.01) | |

(52) U.S. Cl.
CPC ........... *G06F 9/44505* (2013.01); *H04B 1/202* (2013.01); *G08C 19/28* (2013.01)

(58) Field of Classification Search
CPC .... G06F 9/44505; G08C 19/28; H04B 1/202
See application file for complete search history.

(56) References Cited

U.S. PATENT DOCUMENTS

| | | | | |
|---|---|---|---|---|
| 7,605,713 | B2* | 10/2009 | Trinchero | H04B 1/202 340/12.23 |
| 2002/0064370 | A1* | 5/2002 | Berkheimer | G11B 19/02 386/323 |
| 2004/0218098 | A1* | 11/2004 | Lee | H04N 5/45 348/565 |
| 2005/0265691 | A1* | 12/2005 | Sato | H04N 5/4403 386/259 |
| 2007/0036049 | A1* | 2/2007 | Im | G11B 31/003 369/47.16 |
| 2010/0271252 | A1* | 10/2010 | Musschebroeck | G08C 17/02 341/176 |
| 2012/0178371 | A1* | 7/2012 | Patel | G08C 17/00 455/41.3 |

* cited by examiner

*Primary Examiner* — M Elamin
(74) *Attorney, Agent, or Firm* — Zhigang Ma

(57) ABSTRACT

An electronic device includes a processor coupled with at least two loaded media. The electronic device can work at a first working mode and a second working mode. When the electronic device works at the first working module, the processor selects one loaded media and controls the selected loaded media to execute a function according to a first manual operation received by an inputting unit of the electronic device. When the electronic device works at the second working module, the processor controls each of the at least two loaded media to execute a common function according to a second manual operation received by the inputting unit.

8 Claims, 4 Drawing Sheets

ELECTRONIC DEVICE

CROSS-REFERENCE TO RELATED APPLICATIONS

This application claims priority to Chinese Patent Application No. 201310347834.5 filed on Aug. 12, 2013, in the China Intellectual Property Office, the contents of which are incorporated by reference herein.

FIELD

The present disclosure relates to an electronic device for controlling loaded media.

BACKGROUND

Electronic devices, such as televisions, laptop computers, and tablet personal computers, can be coupled to an external electronic device to be controlled by the external electronic device.

BRIEF DESCRIPTION OF THE DRAWINGS

Implementations of the present disclosure will now be described, by way of example only, with reference to the attached figures, wherein.

DETAILED DESCRIPTION

Figure 1:
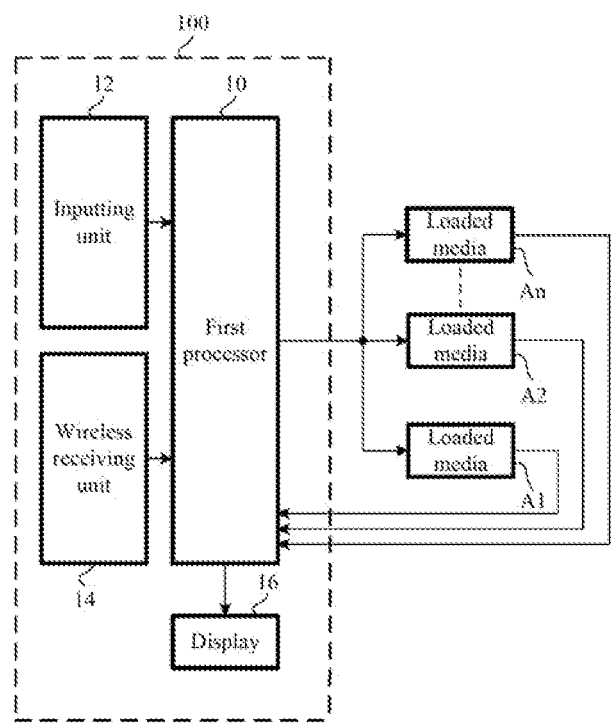
FIG. 1 is a block diagram of an embodiment of an electronic device which is coupled to a number of loaded media.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

An electronic device capable of communicating with at least two loaded media is described.

FIG. 1 illustrates an embodiment of an electronic device 100 coupled to a number of loaded media, for example $A_1$, $A_2$ ... $A_n$. Each of the loaded media $A_1$~$A_n$ can be a television, a digital versatile disc (DVD) player, a laptop computer, a tablet personal computer, a set top box, or other device the like.

The electronic device 100 includes a first processor 10, an inputting unit 12, a wireless receiving unit 14 and a display 16. The electronic device 100 can work at a first working mode and a second working mode according to manual operations on the inputting unit 12.

The inputting unit 12 can be a keyboard, a mouse, a touch screen, a touch pad, or a barcode scanner, for example, for receiving the manual operations.

The first processor 10 is configured to obtain an operating interface of each loaded media and control the display 16 to display the obtained operating interfaces.

When the electronic device 100 works at the first working mode, the processor 10 controls one of the at least two selected loaded media to execute a function, according to a first manual operation received by the inputting unit 12. When the electronic device 100 works at the second working mode, the processor 10 controls the at least two selected loaded media to execute a common function, according to a second manual operation received by the inputting unit 12. In this embodiment, a user can perform the first manual operation and the second manual operation by press different keys on the inputting unit 12.

Figure 2:
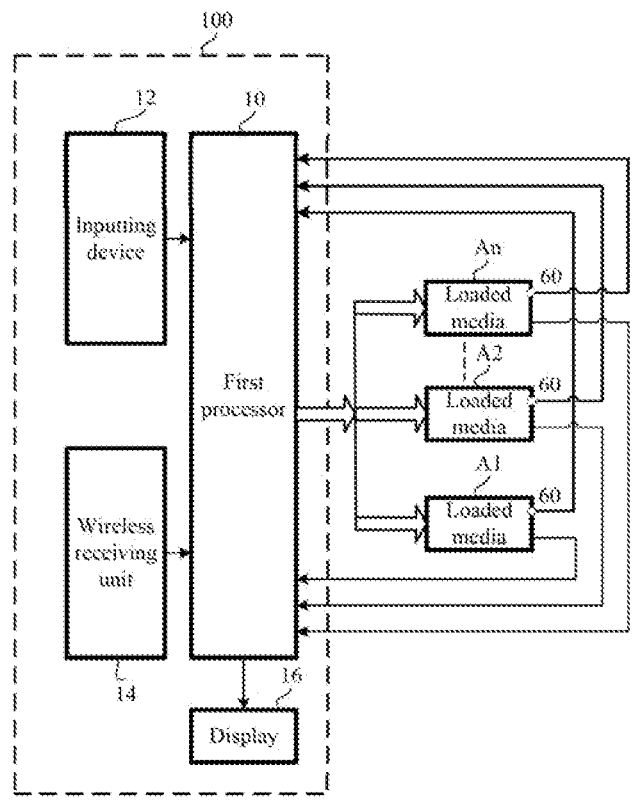
FIG. 2 is a block diagram illustrating detailed connections between the electronic device and the loaded media of FIG. 1 according to a first preferred embodiment.

FIG. 2 is a block diagram illustrating detailed connections between the electronic device and the loaded media of FIG. 1 according to a first preferred embodiment. Each loaded media includes a feedback end 60 which is coupled to the first processor 10. The feedback end 60 generates a feedback voltage indicating a state of the loaded media when a function of the loaded media is executed. For example, if the value of the feedback voltage is 5V, the state of the loaded media is a turned-on state; if the value of the feedback voltage is 0V, the state of the loaded media is a turned-off state; if the value of the feedback voltage is 2V, the state of the corresponding loaded media is a standby state.

The first processor 10 is coupled to one end of a first inter-integrated circuit (I2C) bus 20, and the other end of the first I2C bus 20 is connected to one end of a number of second I2C buses $B_1$, $B_2$~$B_n$ in parallel. The other end of each second I2C bus is coupled to one of the loaded media $A_1$~$A_n$.

When the electronic device 100 works at the first working mode, the first processor 10 select one of the at least two loaded media and controls the selected loaded media to execute a function according to the manual operation received by the inputting unit 12. In the first preferred embodiment, the processor 10 generates a first control signal corresponding to the selected loaded media based on the manual operation, and transmits the first control signal to the selected loaded media through the first I2C bus 20, for controlling the selected loaded media to execute the function. For example, the function can be a channel switch function if the selected loaded media is a television, or the specified function can be volume control function if the selected loaded media is a DVD player. When the specified function is executed by the selected loaded media, the feedback end 60 generates a feedback voltage. The first processor 10 receives the feedback voltage, and controls the display 16 to display the state of the selected loaded media according to the feedback voltage.

When the electronic device 100 works at the second working mode, the first processor 10 controls the at least two loaded media to execute a common function according to the second manual operation. In the first preferred embodiment, the first processor 10 generates a second control signal and transmits the second control signal to each of the at least two loaded media through the first I2C bus and the second I2C buses, for controlling each of the at least two loaded media to execute the common function. The common function can be a function of starting up, turning off, standby, volume controlling, brightness controlling of the loaded media. When the common function is executed by each of the at least two loaded media, the feedback end 60 of each of the at least two loaded media generates the feedback voltage. The first processor 10 receives the feedback voltage of each of the at least two loaded media and controls the display 16 to display the state of each of the at least two loaded media.

Figure 3:
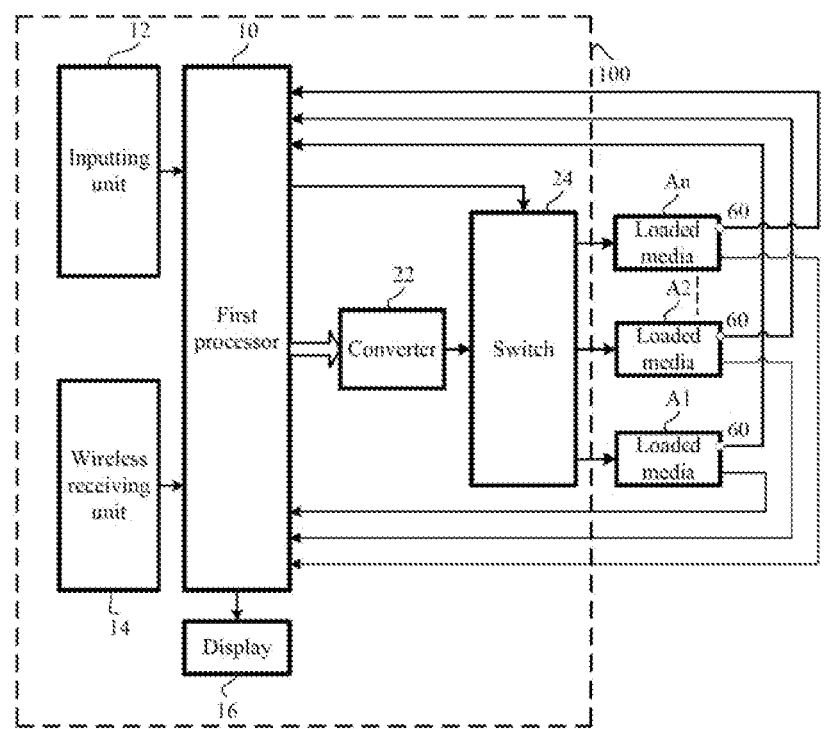
FIG. 3 is a block diagram illustrating detailed connections between the electronic device and the loaded media of FIG. 1 according to a second preferred embodiment.

FIG. 3 illustrates detailed connections between the electronic device 100 and loaded media of FIG. 1 according to a second preferred embodiment.

In the embodiment, the electronic device 100 comprising a converter 22 and a switch 24. The converter 22 is coupled between the first processor 10 and the switch 24. The switch 24 includes a switch terminal and a number of fixed terminals. Each fixed terminals is coupled to one of the at least two loaded media. The first processor 10 controls the switch terminal to connect with one fixed terminals for turning on the corresponding load media. Each loaded media includes the feedback end 60 which is coupled to the first processor 10.

When the electronic device 100 works at the first working mode, the processor 10 generates a third signal based on the manual operations to select one of the at least two loaded media and controls the switch 24 to turn on the selected loaded media. The converter 22 converts the third control signal into a specified format supported by the selected loaded media. The converted control signal is transmitted to the selected loaded media through the switch 24, for controlling the selected loaded media to execute the function. In this embodiment, the specified format is universal serial bus format.

When the electronic device 100 works at the second working mode, the first processor 10 generates a forth control signal and controls the switch 24 turn on the at least two loaded media in turn. The converter 22 converts the format of the forth control signals into the specified format. The converted control signals are transmitted to each of the at least two loaded media through the switch 24, for controlling the at least two loaded media to execute the common function.

Figure 4:
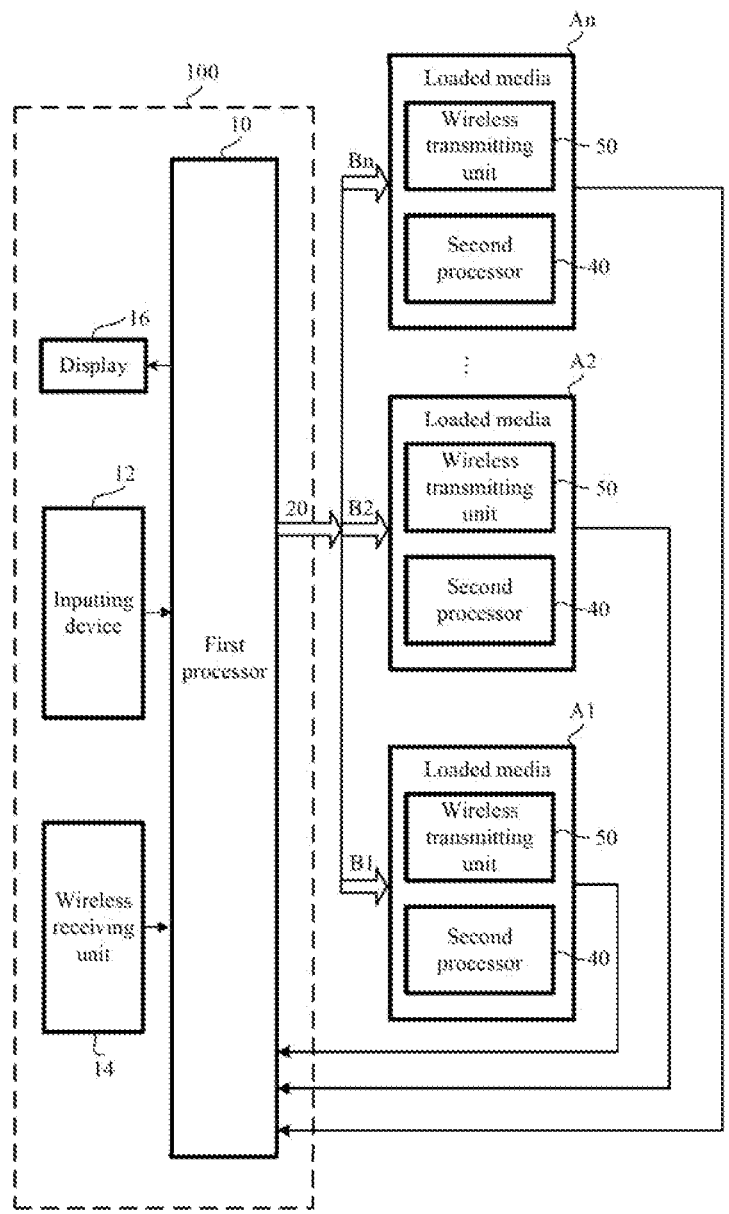
FIG. 4 is a block diagram illustrating detailed connections between the electronic device and the loaded media of FIG. 1 according to a third preferred embodiment.

FIG. 4 is a block diagram illustrating detailed connections between the electronic device 100 and the loaded media of FIG. 1 according to a third preferred embodiment.

In the embodiment, the loaded media includes a second processor 40 and a wireless transmitting unit 50. The second processor 40 generates a wireless signal indicating the state of the loaded media when the function of the loaded media is executed, and controls the wireless transmit unit 50 to transmit the wireless signal.

When the electronic device 100 works at the first working mode, the first processor 10 controls the selected loaded media to execute the function. When the function is executed by the selected loaded media, the second processor 40 generates the wireless signal and controls the wireless transmitting unit 50 to transmit the wireless signal to the wireless receiving unit 14. The wireless receiving unit 14 receives the wireless signal from the selected loaded media. The first processor 10 controls the display 16 to display the state of the selected loaded media based on the wireless signal.

When the electronic device 100 works at the second working mode, the first processor 10 controls the at least two loaded media to execute the common function. When the common function is executed by each of the at least two loaded media, the second processor 40 generates the wireless signal and controls the wireless transmitting unit 50 to transmit the wireless signal to the wireless receiving unit 14. The first processor 10 controls the display 16 to display the state of the at least two loaded media according to the wireless signals of each of the at least two loaded media.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. An electronic device having a first working mode and a second working mode and configured to be coupled to at least two loaded media, the electronic device comprising:
   an inputting unit configured to receive manual operations;
   a converter;
   a switch; and
   a first processor configured to select one of the at least two loaded media and control the loaded media to execute a function, according to a first manual operation received by the inputting unit when the electronic device is in the first working mode; wherein the first processor is further configured to control each of the at least two loaded media to execute a common function according to a second manual operation received by the inputting unit when the electronic device is in the second working mode;
   wherein the converter is coupled between the first processor and the switch, the switch is coupled to the at least two loaded media; when the electronic device works at the first working mode, the first processor is configured to control the switch to turn on the selected loaded media and generate a third control signal, the converter is configured to convert the format of the third control signal into a specified format supported by the selected loaded media, for controlling the selected loaded media to execute the function;
   when the electronic device works at the second working mode, the first processor is configured to turn on each of the at least two loaded media in turn and generate a fourth control signal, the converter is configured to convert the format of the fourth control signal into the specified format and transmits the converted fourth control signal to each of the at least two loaded media, for controlling each of the at least two loaded media to execute the common function.

2. The electronic device as claimed in claim 1, wherein the first processor is coupled to a first inter-integrated circuit bus which is coupled to a plurality of second inter-integrated circuit buses in parallel, each second inter-integrated circuit buses is coupled to one of the at least two loaded media.

3. The electronic device as claimed in claim 2, wherein when the electronic device works at the first working mode, the first processor is further configured to generate a first control signal corresponding to the selected load media and transmits the first control signal to the selected loaded media through the first inter-integrated circuit bus and a corresponding second inter-integrated circuit bus, for controlling the selected load media to execute the function; and when the electronic device works at the second working mode, the first processor is configured to generate a second control signal and transmits the second control signal to each of the at least two loaded media through the first inter-integrated circuit bus and the second inter-integrated circuit buses, for controlling each of the at least two loaded media to execute the common function.

4. The electronic device as claimed in claim 1, wherein the predetermined format is a universal serial bus format.

5. The electronic device as claimed in claim 1, further comprising a display, wherein each loaded media is configured to generate a feedback signal indicating a state of the selected loaded media when the function of the electronic device is executed;
   when the electronic device works at the first working mode, the first processor is configured to receive the feedback signal from the selected loaded media and control the display to display the state of the selected loaded media according to the feedback signal; and
   when the electronic device works at the second working mode, the first processor is configured to receive the feedback signal from each of the at least two loaded media and control the display to display the state of each of the at least two loaded media according to the feedback signals.

6. The electronic device as claimed in claim 1, further comprising a wireless receiving unit and a display, wherein each loaded media further comprising a second processor and a wireless transmitting unit, the second processor of each loaded media is configured to generate a wireless signal indicating the state of the loaded media;
   when the electronic device works at the first working mode, the wireless receiving unit is configured to receive the wireless signal from the selected loaded media when the function is executed by the selected loaded media, the first processor is configured to control the display to display the state of the selected loaded media according to the wireless signal;
   when the electronic device works at the second working mode, the wireless receiving unit is configured to receive the wireless signal from each of the at least two loaded media when the common function is executed by each of the at least two loaded media, and the first processor is configured to control the display to display the state of each loaded media according to the wireless signals.

7. An electronic device having a first working mode and a second working mode and configured to be coupled to at least two loaded media, the electronic device comprising:
   an inputting unit configured to receive manual operations;
   a display;
   and
   a first processor configured to select one of the at least two loaded media and control the loaded media to execute a function, according to a first manual operation received by the inputting unit when the electronic device is in the first working mode; wherein the first processor is further configured to control each of the at least two loaded media to execute a common function according to a second manual operation received by the inputting unit when the electronic device is in the second working mode;
   wherein each loaded media is configured to generate a feedback signal indicating a state of the selected loaded media when the function of the electronic device is executed;
   when the electronic device works at the first working mode, the first processor is configured to receive the feedback signal from the selected loaded media and control the display to display the state of the selected loaded media according to the feedback signal; and
   when the electronic device works at the second working mode, the first processor is configured to receive the feedback signal from each of the at least two loaded media and control the display to display the state of each of the at least two loaded media according to the feedback signals.

8. An electronic device having a first working mode and a second working mode and configured to be coupled to at least two loaded media, the electronic device comprising:
   an inputting unit configured to receive manual operations;
   a display;
   a wireless receiving unit; and
   a first processor configured to select one of the at least two loaded media and control the loaded media to execute a function, according to a first manual operation received by the inputting unit when the electronic device is in the first working mode; wherein the first processor is further configured to control each of the at least two loaded media to execute a common function according to a second manual operation received by the inputting unit when the electronic device is in the second working mode;
   wherein each loaded media further comprising a second processor and a wireless transmitting unit, the second processor of each loaded media is configured to generate a wireless signal indicating the state of the loaded media;
   when the electronic device works at the first working mode, the wireless receiving unit is configured to receive the wireless signal from the selected loaded media when the function is executed by the selected loaded media, the first processor is configured to control the display to display the state of the selected loaded media according to the wireless signal;
   when the electronic device works at the second working mode, the wireless receiving unit is configured to receive the wireless signal from each of the at least two loaded media when the common function is executed by each of the at least two loaded media, and the first processor is configured to control the display to display the state of each loaded media according to the wireless signals.

* * * * *